(12) United States Patent
Pilebro (10) Patent No.: US 9,823,026 B2
(45) Date of Patent: Nov. 21, 2017

(54) THERMAL ENERGY STORAGE WITH AN EXPANSION SPACE

(71) Applicant: Skanska Sverige AB, Stockholm (SE)

(72) Inventor: Hans Pilebro, Enebyberg (SE)

(73) Assignee: SKANSKA SVERIGE AB, Stockholm (SE)

( * ) Notice: Subject to any disclaimer, the term of this patent is extended or adjusted under 35 U.S.C. 154(b) by 0 days.

(21) Appl. No.: 14/439,748

(22) PCT Filed: Nov. 1, 2013

(86) PCT No.: PCT/SE2013/051280
§ 371 (c)(1),
(2) Date: Apr. 30, 2015

(87) PCT Pub. No.: WO2014/070095
PCT Pub. Date: May 8, 2014

(65) Prior Publication Data
US 2015/0354903 A1 Dec. 10, 2015

(30) Foreign Application Priority Data
Nov. 1, 2012 (SE) ........................ 1251239

(51) Int. Cl.
*F24J 3/08* (2006.01)
*F28D 20/00* (2006.01)
*B65G 5/00* (2006.01)

(52) U.S. Cl.
CPC ........... *F28D 20/0052* (2013.01); *B65G 5/00* (2013.01); *F28D 20/0043* (2013.01); *F28D 2020/006* (2013.01); *Y02E 60/142* (2013.01)

(58) Field of Classification Search
CPC ............. F28D 20/0052; F28D 20/0043; F28D 2020/006; B65G 5/00; Y02E 60/142
See application file for complete search history.

(56) References Cited

U.S. PATENT DOCUMENTS

| 1,639,172 A | 8/1927 | Forcada |
| 2,737,789 A | 3/1956 | Ruff |

(Continued)

FOREIGN PATENT DOCUMENTS

| CA | 2413819 | 6/2004 |
| CL | 2010001430 | 12/2010 |

(Continued)

OTHER PUBLICATIONS

Riley, Alex. "BBC—Earth—A strange extinct animal made this giant stone corkscrew", Jul. 28, 2016. [Retrieved on Sep. 3, 2016]. Retrieved from the Internet: URL:<http://www.bbc.com/earth/story/20160727-extinct-giant-beavers-made-stone-corkscrews-instead-of-dams>.
"3.5 Hydraulic Gradient and Energy Gradient", 5.4-1 to 5.4-99.
Peletier, Mark A. "Energies, gradient flows, and large deviations: a modelling point of view", Aug. 28, 2012. Version 0.2, pp. 1-31.

(Continued)

*Primary Examiner* — Ljiljana Ciric
(74) *Attorney, Agent, or Firm* — Kagan Binder, PLLC (57) ABSTRACT

An arrangement for storing thermal energy, including a shaft (1) and at least one tunnel (2), the shaft (1) and the tunnel (2) being in fluid communication with each other. The tunnel (2) includes at least a first (2*a*), a second (2*b*), and a third (2*c*) tunnel section. The second tunnel section (2*b*) is arranged between and connected to the first (2*a*) and third (2*c*) tunnel sections. The second tunnel section (2*b*) is sealed off at an end (4) connected to the third tunnel section (2*c*), and the third tunnel section is further connected the shaft (1). The shaft (1) and first (2*a*) and third (2*c*) tunnel sections hold fluid for thermal storage. The second tunnel section (2*b*) is an expansion space should a volume of the fluid expand beyond a volume of the shaft (1) and the first (2*a*) and third (2*c*) tunnel sections.

13 Claims, 4 Drawing Sheets

(56) References Cited

U.S. PATENT DOCUMENTS

| | | | | |
|---|---|---|---|---|
| 2,749,714 A | * | 6/1956 | Hunter | B65G 5/00 166/50 |
| 2,766,200 A | | 10/1956 | Kaufman | |
| 2,780,070 A | * | 2/1957 | Meade | B65G 5/00 405/133 |
| 2,787,125 A | * | 4/1957 | Benz | B65G 5/00 166/67 |
| 2,818,118 A | * | 12/1957 | Dixon | E21B 43/2401 166/248 |
| 2,855,757 A | * | 10/1958 | Meade | B65G 5/00 299/19 |
| 2,879,646 A | * | 3/1959 | Brandt | B65G 5/00 220/560.08 |
| 2,883,833 A | * | 4/1959 | Miles | B65G 5/00 166/80.1 |
| 2,893,211 A | * | 7/1959 | Brandt | B65G 5/00 299/19 |
| 2,901,889 A | * | 9/1959 | Reed | B65G 5/00 166/67 |
| 2,928,247 A | * | 3/1960 | Hubbell | B65G 5/00 166/250.08 |
| 2,928,248 A | * | 3/1960 | Hubbell | B65G 5/00 299/19 |
| 2,928,249 A | * | 3/1960 | Miles | B65G 5/00 405/53 |
| 2,932,170 A | * | 4/1960 | Patterson | B65G 5/00 166/57 |
| 2,947,146 A | * | 8/1960 | Loofbourow | B65G 5/00 166/285 |
| 2,962,095 A | * | 11/1960 | Morse | E21B 43/247 166/259 |
| 2,981,070 A | * | 4/1961 | Seely, Jr. | B65G 5/00 405/53 |
| 3,064,436 A | * | 11/1962 | Loofbourow | B65G 5/00 166/285 |
| 3,068,654 A | * | 12/1962 | Warren | B65G 5/00 299/10 |
| 3,097,694 A | * | 7/1963 | Kerver | C09K 8/665 166/276 |
| 3,227,211 A | * | 1/1966 | Gilchrist | E21B 43/247 166/257 |
| 3,402,769 A | * | 9/1968 | Doggett | E21B 43/26 166/250.1 |
| 3,427,652 A | * | 2/1969 | Seay | E21B 43/26 166/250.1 |
| 3,448,792 A | | 6/1969 | Lawrence | |
| 3,470,943 A | * | 10/1969 | Van Huisen | F03G 7/04 159/902 |
| 3,580,330 A | * | 5/1971 | Maugis | F24J 3/085 165/135 |
| 3,593,791 A | * | 7/1971 | Parker | E21B 43/17 166/271 |
| 3,603,096 A | * | 9/1971 | Wells | B65G 5/00 118/317 |
| 3,640,336 A | * | 2/1972 | Dixon | E21B 43/2635 165/45 |
| 3,679,264 A | * | 7/1972 | Van Huisen | E21B 43/281 165/45 |
| 3,685,330 A | | 8/1972 | Funke | |
| 3,737,105 A | | 6/1973 | Arnold et al. | |
| 3,742,716 A | * | 7/1973 | Backstrom | B65G 5/00 405/139 |
| 3,757,516 A | | 9/1973 | McCabe | |
| 3,786,858 A | * | 1/1974 | Potter | F24D 12/00 165 |
| 3,807,491 A | | 4/1974 | Van Hulsen | |
| 3,817,038 A | | 6/1974 | Paull et al. | |
| 3,857,244 A | | 12/1974 | Faucette | |
| 3,863,709 A | | 2/1975 | Fitch | |
| 3,864,208 A | * | 2/1975 | Van Huisen | C02F 11/10 166/247 |
| 3,878,884 A | * | 4/1975 | Raleigh | E21B 43/17 165/45 |
| 3,921,405 A | * | 11/1975 | Rosciszewski | F03G 7/00 376/146 |
| 3,923,248 A | | 12/1975 | Cresswell | |
| 3,931,851 A | * | 1/1976 | Harris | F24D 11/00 126/567 |
| 3,939,356 A | | 2/1976 | Loane | |
| 3,943,722 A | | 3/1976 | Ross | |
| 3,957,108 A | * | 5/1976 | Van Huisen | F03G 7/04 165/45 |
| 3,965,972 A | | 6/1976 | Peterson | |
| 3,967,675 A | * | 7/1976 | Georgii | F03G 7/04 165/45 |
| 3,986,339 A | | 10/1976 | Janelid | |
| 3,986,362 A | | 10/1976 | Baciu | |
| 3,991,817 A | * | 11/1976 | Clay | E21B 7/00 165/45 |
| 4,008,709 A | | 2/1977 | Jardine | |
| 4,030,549 A | * | 6/1977 | Bouck | E21B 43/2401 165/45 |
| 4,031,952 A | | 6/1977 | Contour | |
| 4,037,583 A | * | 7/1977 | Bakun | F24J 2/202 126/400 |
| 4,044,830 A | * | 8/1977 | Van Huisen | E21B 43/305 165/45 |
| 4,047,093 A | | 9/1977 | Levoy | |
| 4,060,988 A | | 12/1977 | Arnold | |
| 4,078,904 A | * | 3/1978 | Galt | C01B 3/061 423/657 |
| 4,079,590 A | * | 3/1978 | Sheinbaum | F01K 3/18 165/45 |
| 4,121,429 A | | 10/1978 | Grennard | |
| 4,137,720 A | | 2/1979 | Rex | |
| 4,139,056 A | | 2/1979 | Schöll | |
| 4,143,816 A | | 3/1979 | Skadeland | |
| 4,147,204 A | * | 4/1979 | Pfenninger | B65G 5/00 165/4 |
| 4,149,389 A | | 4/1979 | Hayes et al. | |
| 4,157,730 A | | 6/1979 | Despois et al. | |
| 4,174,009 A | | 11/1979 | Laing et al. | |
| 4,194,856 A | | 3/1980 | Jahns | |
| 4,200,152 A | * | 4/1980 | Foster | E21B 41/005 165/45 |
| 4,201,060 A | * | 5/1980 | Outmans | F03G 7/04 165/45 |
| 4,210,201 A | * | 7/1980 | O'Hanlon | F28D 20/0052 126/641 |
| 4,211,613 A | | 7/1980 | Meckler | |
| 4,219,074 A | | 8/1980 | Hansen | |
| 4,223,729 A | * | 9/1980 | Foster | E21B 43/17 165/45 |
| 4,234,037 A | | 11/1980 | Rogers et al. | |
| 4,241,724 A | | 12/1980 | Hull | |
| 4,271,681 A | | 6/1981 | Schertz | |
| 4,286,141 A | | 8/1981 | MacCracken | |
| 4,286,574 A | * | 9/1981 | Vrolyk | F28D 20/0056 126/400 |
| 4,290,266 A | | 9/1981 | Twite et al. | |
| 4,291,751 A | | 9/1981 | Wolf | |
| 4,297,847 A | | 11/1981 | Clayton | |
| 4,345,652 A | * | 8/1982 | Roque | C09K 8/845 166/271 |
| 4,351,651 A | | 9/1982 | Courneya | |
| 4,361,135 A | | 11/1982 | Metz | |
| 4,363,563 A | | 12/1982 | Hallenius et al. | |
| 4,375,157 A | | 3/1983 | Boesen | |
| 4,392,351 A | | 7/1983 | Doundoulakis | |
| 4,392,531 A | * | 7/1983 | Ippolito | E21B 43/04 165/45 |
| 4,399,656 A | | 8/1983 | Laing et al. | |
| 4,401,162 A | * | 8/1983 | Osborne | E21B 36/04 166/248 |
| 4,402,188 A | | 9/1983 | Skala | |
| 4,415,034 A | * | 11/1983 | Bouck | E21B 43/2401 166/248 |
| 4,418,549 A | | 12/1983 | Courneya | |

(56) References Cited

U.S. PATENT DOCUMENTS

| | | | |
|---|---|---|---|
| 4,440,148 A | 4/1984 | Assaf | |
| 4,448,237 A | 5/1984 | Riley | |
| 4,454,721 A * | 6/1984 | Hurlimann | B65G 5/00 |
| | | | 405/55 |
| 4,462,463 A | 7/1984 | Gorham, Jr. | |
| 4,474,506 A * | 10/1984 | Sagefors | B65G 5/00 |
| | | | 405/132 |
| 4,476,932 A * | 10/1984 | Emery | E21B 36/00 |
| | | | 166/302 |
| 4,479,541 A * | 10/1984 | Wang | E21B 7/18 |
| | | | 166/223 |
| 4,498,454 A | 2/1985 | Assaf | |
| 4,505,322 A * | 3/1985 | Larson | F28D 20/0052 |
| | | | 165/10 |
| 4,510,920 A | 4/1985 | Walmet | |
| 4,522,254 A | 6/1985 | Koizumi et al. | |
| 4,554,797 A | 11/1985 | Goldstien | |
| 4,566,527 A | 1/1986 | Pell et al. | |
| 4,577,679 A | 3/1986 | Hibshman | |
| 4,607,488 A | 8/1986 | Karinthi et al. | |
| 4,632,604 A | 12/1986 | McKelvy | |
| 4,633,948 A * | 1/1987 | Closmann | E21B 43/305 |
| | | | 166/245 |
| 4,642,987 A | 2/1987 | Csorba et al. | |
| 4,652,181 A | 3/1987 | Bergman et al. | |
| 4,671,351 A | 6/1987 | Rappe | |
| 4,693,301 A | 9/1987 | Baehrle et al. | |
| 4,708,523 A * | 11/1987 | Sagefors | E21D 13/00 |
| | | | 405/129.35 |
| 4,723,604 A * | 2/1988 | Emery | E21B 43/26 |
| | | | 166/280.1 |
| 4,867,241 A * | 9/1989 | Strubhar | E21B 7/04 |
| | | | 166/250.09 |
| 4,912,941 A * | 4/1990 | Buchi | E21B 33/13 |
| | | | 165/45 |
| 4,974,675 A * | 12/1990 | Austin | E21B 43/26 |
| | | | 166/250.1 |
| 4,977,961 A * | 12/1990 | Avasthi | E21B 43/26 |
| | | | 166/297 |
| 5,074,360 A * | 12/1991 | Guinn | E21B 43/17 |
| | | | 166/245 |
| 5,085,276 A * | 2/1992 | Rivas | E21B 43/26 |
| | | | 166/303 |
| 5,088,471 A | 2/1992 | Bottum | |
| 5,355,688 A | 10/1994 | Rafalovich et al. | |
| 5,507,149 A | 4/1996 | Dash et al. | |
| 5,620,049 A * | 4/1997 | Gipson | E21B 43/2401 |
| | | | 166/248 |
| 5,678,626 A | 10/1997 | Gilles | |
| 5,937,663 A | 8/1999 | Chen et al. | |
| 5,937,934 A * | 8/1999 | Hildebrand | F24J 3/085 |
| | | | 165/120 |
| 5,941,238 A | 8/1999 | Tracy | |
| 6,098,705 A | 8/2000 | Kim | |
| 6,138,614 A | 10/2000 | Shropshire | |
| 6,199,515 B1 | 3/2001 | Clarke | |
| 6,247,313 B1 * | 6/2001 | Moe | E21B 43/305 |
| | | | 60/641.2 |
| 6,367,566 B1 * | 4/2002 | Hill | E21B 43/26 |
| | | | 166/370 |
| 6,379,146 B1 | 4/2002 | Zink et al. | |
| 6,668,554 B1 * | 12/2003 | Brown | E21B 41/0064 |
| | | | 60/641.2 |
| 6,701,914 B2 | 3/2004 | Schwarz | |
| 6,994,156 B2 * | 2/2006 | Kopko | F24F 5/0017 |
| | | | 165/201 |
| 7,007,501 B2 | 3/2006 | Hu | |
| 7,228,908 B2 * | 6/2007 | East, Jr. | E21B 43/16 |
| | | | 166/271 |
| 7,753,122 B2 * | 7/2010 | Curlett | E21B 43/17 |
| | | | 166/302 |
| 8,322,092 B2 * | 12/2012 | Isaacs | F24D 3/005 |
| | | | 165/10 |
| 8,595,998 B2 * | 12/2013 | Isaacs | F24J 3/082 |
| | | | 165/10 |
| 8,596,355 B2 * | 12/2013 | Kaminsky | E21B 41/0064 |
| | | | 166/255.2 |
| 8,616,000 B2 | 12/2013 | Parrella, Sr. | |
| 8,770,284 B2 * | 7/2014 | Meurer | E21B 36/04 |
| | | | 166/248 |
| 8,931,553 B2 * | 1/2015 | Cannan | E21B 43/25 |
| | | | 166/250.01 |
| 9,028,171 B1 * | 5/2015 | Seldner | C10G 1/02 |
| | | | 405/129.28 |
| 9,080,441 B2 * | 7/2015 | Meurer | E21B 43/2401 |
| 9,091,460 B2 * | 7/2015 | Parrella, Sr. | F24J 3/081 |
| 9,181,931 B2 * | 11/2015 | McBay | F03G 7/04 |
| 9,371,185 B2 * | 6/2016 | Gu | E21C 41/16 |
| 9,518,787 B2 * | 12/2016 | Pilebro | F28D 20/0039 |
| 2002/0036076 A1 | 3/2002 | Eastman | |
| 2002/0179298 A1 * | 12/2002 | Kopko | F24F 5/0017 |
| | | | 165/201 |
| 2004/0031585 A1 * | 2/2004 | Johnson, Jr. | E21B 23/00 |
| | | | 165/45 |
| 2004/0251011 A1 | 12/2004 | Kudo | |
| 2006/0107664 A1 | 5/2006 | Hudson et al. | |
| 2006/0108107 A1 | 5/2006 | Naukkarinen | |
| 2007/0017243 A1 | 1/2007 | Kidwell et al. | |
| 2007/0023163 A1 | 2/2007 | Kidwell et al. | |
| 2007/0125528 A1 | 6/2007 | Fakheri | |
| 2007/0158947 A1 | 7/2007 | Annen et al. | |
| 2008/0149573 A1 | 6/2008 | Fein et al. | |
| 2008/0163950 A1 | 7/2008 | Andersen et al. | |
| 2009/0020265 A1 | 1/2009 | Feinauer et al. | |
| 2009/0120090 A1 | 5/2009 | DuBois | |
| 2009/0120091 A1 | 5/2009 | DuBois | |
| 2009/0211727 A1 | 8/2009 | Yin et al. | |
| 2009/0293862 A1 * | 12/2009 | Bailey | F24D 3/105 |
| | | | 126/617 |
| 2010/0101767 A1 | 4/2010 | Furui et al. | |
| 2010/0230071 A1 | 9/2010 | Slater | |
| 2010/0294456 A1 | 11/2010 | Taraba et al. | |
| 2011/0041784 A1 | 2/2011 | McAlister | |
| 2011/0247328 A1 | 10/2011 | DuBois | |
| 2012/0006503 A1 * | 1/2012 | Sun | E21F 1/18 |
| | | | 165/10 |
| 2012/0030824 A1 | 2/2012 | Hoffman et al. | |
| 2012/0037335 A1 | 2/2012 | Asai et al. | |
| 2012/0048259 A1 | 3/2012 | Wagner et al. | |
| 2012/0132393 A1 | 5/2012 | Pilebro et al. | |
| 2012/0149944 A1 | 6/2012 | Zmierczak et al. | |
| 2012/0180508 A1 | 7/2012 | Endoh et al. | |
| 2012/0255706 A1 | 10/2012 | Tadayon et al. | |
| 2012/0318474 A1 | 12/2012 | Lieskoski | |
| 2013/0068418 A1 * | 3/2013 | Gotland | F24J 3/08 |
| | | | 165/45 |
| 2013/0112155 A1 | 5/2013 | Abdel-Rehim et al. | |
| 2013/0232973 A1 | 9/2013 | McBay | |
| 2013/0333860 A1 * | 12/2013 | Stubler | E04H 3/12 |
| | | | 165/56 |
| 2014/0262137 A1 | 9/2014 | McBay | |
| 2014/0318737 A1 | 10/2014 | Kaasa et al. | |
| 2015/0013949 A1 | 1/2015 | Arnot | |
| 2015/0101779 A1 | 4/2015 | Parrella, Sr. | |
| 2015/0276325 A1 | 10/2015 | Pilebro | |
| 2015/0283565 A1 | 10/2015 | Strand | |
| 2015/0292809 A1 | 10/2015 | Pilebro et al. | |
| 2015/0292810 A1 | 10/2015 | Pilebro et al. | |
| 2016/0187031 A1 * | 6/2016 | McBay | F03G 7/04 |
| | | | 165/45 |

FOREIGN PATENT DOCUMENTS

| | | |
|---|---|---|
| CN | 102077050 | 5/2011 |
| CN | 102459824 | 5/2012 |
| CN | 102483311 | 5/2012 |
| CN | 102607208 | 7/2012 |
| CN | 102762948 | 10/2012 |
| DE | 130466 | 4/1978 |
| DE | 2801791 | 7/1979 |
| DE | 2811439 | 9/1979 |

(56) References Cited

FOREIGN PATENT DOCUMENTS

| | | |
|---|---|---|
| DE | 10039581 | 6/2002 |
| DE | 202006012225 | 10/2006 |
| DE | 102007056720 | 6/2009 |
| DE | 102008001308 | 7/2009 |
| DE | 102012211921 | 1/2014 |
| EP | 0198808 | 10/1986 |
| EP | 0271319 | 6/1988 |
| EP | 0683362 | 11/1995 |
| EP | 0819893 | 1/1998 |
| EP | 2031333 | 3/2009 |
| EP | 2078913 | 7/2009 |
| EP | 2085705 | 8/2009 |
| EP | 2141433 | 1/2010 |
| EP | 2418449 | 2/2012 |
| EP | 2479517 | 7/2012 |
| FR | 2826436 | 12/2002 |
| GB | 2459955 | 11/2009 |
| JP | S54128818 | 10/1979 |
| JP | 59-231395 | 12/1984 |
| JP | H0220799 | 5/1990 |
| JP | 5-179852 | 7/1993 |
| JP | H11158899 | 6/1999 |
| JP | 2001-193897 | 7/2001 |
| JP | 2002-173946 | 6/2002 |
| JP | 2002-194760 | 7/2002 |
| JP | 3648669 | 2/2005 |
| JP | 38-21938 | 9/2006 |
| JP | 2011-220603 | 11/2011 |
| KR | 10-2011-0046392 | 5/2011 |
| KR | 101170274 | 7/2012 |
| KR | 20120077106 | 7/2012 |
| WO | WO8300526 | 2/1983 |
| WO | 96/14544 | 5/1996 |
| WO | 2007/065001 | 6/2007 |
| WO | 2010/045011 | 4/2010 |
| WO | 2011/016768 | 2/2011 |
| WO | 2011/116736 | 9/2011 |
| WO | 2012/168352 | 12/2012 |
| WO | 2013/173709 | 11/2013 |

OTHER PUBLICATIONS

De Carli, Michele and Zarella, Angelo. "Modelling and Analysis of Helical Pipe in Ground Heat Exchanger Design", GSHP Associates Technical Seminar: Truly Renewable Heating & Cooling, London, Dec. 5, 2013, pp. 1-23.
"Iconic underground structures—TunnelTalk Iconic underground structures", Sep. 2010. [retrieved on Sep. 3, 2016]. Retrieved from the Internet:URL:<http://www.tunneltalk.com/Discussion-Forum-Sep10-Iconic-underground-structures.php>.
Wikipedia, the free encyclopedia: "List of spiral tunnels and tunnels on a curved alignment". [retrieved on Sep. 9, 2016]. Retrieved from the Internet:< URL: //https://en.wikipedia.org/wiki/List_of_spiral_tunnels_and_tunnels_on_a_curved_alignment>.
Pells, P.J. N. "The Sydney Opera House Underground Parking Station".
Wikipedia, the free encyclopedia: "Skolithos". [retrieved on Sep. 3, 2016]. Retrieved from the Internet: URL:<https://en.wikipedia.org/wiki/Skolithos>.
"Analysis of short helical and double U-tube borehole heat exchangers: A simulation-based comparison" (abstract). Applied Energy, Dec. 2013. Available online:Jul. 12, 2013. [retrieved on Sep. 3, 2016]. Retrieved from the Internet: <http://zj5lm7ny2a.search.serialssolutions.com/ ... e=20131201 &au last=Zarrella, %20Angelo&spage=358&pages=358-370.
Nash, Darren. "Goannas Dig the Deepest, Twistiest Burrows of All—Scientific American Blog Network", Jul. 6, 2015. [retrieved on Sep. 3, 2016]. Retrieved from the Internet:<URL:http://blogs.scientificamerican.com/tetrapod-zoology/goannas-dig-the-thedeepest-twistiest-burrows-of-all/.
"Tracing large tetrapod burrows from the Permian of Nei Mongol, China", Chinese Academy of Sciences, Dec. 31, 2013. [retrieved on Sep. 3, 2016]. Retrieved from the Internet:<URL: http://phys.org/news/2013-12-large-tetrapod-burrows-permian-nei.html>.
Extended European Search Report, European Application No. 13852022.6, dated Oct. 28, 2015 (3 pages).
Extended European Search Report, European Application No. 13851337, dated Dec. 17, 2015 (2 pages).
First Office Action for Chilean Application No. 2015-001143, dated Jun. 15, 2017 (11 pages).

\* cited by examiner

THERMAL ENERGY STORAGE WITH AN EXPANSION SPACE

This application claims benefit from International Application No. PCT/SE2013/051280, which was filed on Nov. 1, 2013, which claims priority to Swedish Patent Application No. 1251239-8, which was filed Nov. 1, 2012, the entireties of said patent applications are incorporated herein by reference.

FIELD OF THE INVENTION

The present invention relates to an arrangement for storing thermal energy, comprising a shaft and at least one tunnel, the shaft and the at least one tunnel being in fluid communication with each other. The shaft and the at least one tunnel are adapted for holding fluid for thermal storage.

BACKGROUND OF THE INVENTION

There is a need for efficient storage of thermal energy within the area of modern energy technology.

Thermal energy may advantageously be stored in a fluid, such as e.g. water, above ground in insulated tanks, in ground in insulated pits, or underground in excavated caverns, using the surrounding ground as insulation. The thermal energy of the fluid is preserved to a great extent during an extended period of time. Today, these methods are used in different parts of the world in order to satisfy the need for storing thermal energy between different seasons, e.g. storing temporary surplus heat which is used later on when there is a demand for it and, preferably, when its financial value is higher. The main transition of energy is from the summer half, when there is less need for heating, to the winter half, when the need for heating is much higher. However, there is also much to gain by using the storage for short-term variations and always actively storing surplus heat. These kinds of storages may also be used for storage of a colder fluid, to be used for cooling, as well as for fluid having an intermediate temperature, such as a fluid used in low temperature systems.

When storing thermal energy underground, one must consider that the warmer the fluid becomes, the more it expands, and hence the more space the fluid requires. Further, one must consider the possibility of leakage or accidents where fluid enters into areas of the storage where it is not supposed to be, and hence the easy, fast and safe removal of such fluid. Further, one must consider the influence which the storage might have on the surrounding ground water level.

Swedish patent application 0950576-9 discloses one kind of efficient storage of thermal energy. However, there is still a need for an even more improved arrangement for storing thermal energy underground.

SUMMARY OF THE INVENTION

An object according to an aspect of present invention is to provide an environmentally friendly arrangement for storing thermal energy underground, in which arrangement overall thermal energy losses can be reduced. A further object is to provide an improved arrangement for storing thermal energy having sufficient expansion and safety space without incurring unnecessary construction or operating costs, and an arrangement wherein any fluid located within the expansion and safety space can be used in the thermal energy storing cycle.

According to a first aspect of the present invention, these objects are achieved by an arrangement for storing thermal energy, comprising a shaft and at least one tunnel, the shaft and the at least one tunnel being in fluid communication with each other, the tunnel comprising at least a first, a second, and a third tunnel section, the second tunnel section being arranged between and connected to the first and third tunnel sections, the second tunnel section being sealed off at an end connected to the third tunnel section, and the third tunnel section further being connected to the shaft, the shaft and first and third tunnel sections being adapted for holding fluid for thermal storage, the second tunnel section being adapted for use as an expansion space should a volume of the fluid expand beyond a volume of the shaft and the first and third tunnel sections, the arrangement further comprising a first transfer means for passing the expanded fluid volume from the shaft and/or the third tunnel section temporarily into said first tunnel section, and a second transfer means for passing the expanded fluid volume from the first tunnel section to the second tunnel section.

Such an arrangement facilitates a thermal energy storage having a number of built-in expansion spaces, which allows the storage to be flooded by excess fluid or to contain too little fluid, without the consequences being too severe.

The first transfer means may comprise a pipe or a channel.

The second transfer means may comprise a pipe, a channel, a partial wall, or a one-way valve. As far as possible, the arrangement uses gravity, i.e. the easiest and cheapest solution possible, for passing the fluid of the storage from one part to another.

In one embodiment, the arrangement further comprises a separate machine room being arranged in proximity to the shaft, and third transfer means connecting the machine room to the second tunnel section. The transfer means facilitates easy and safe removal of fluid from the machine room to the tunnel.

The third transfer means may comprise a pipe or a channel. As far as possible, the arrangement uses gravity, i.e. the easiest and cheapest solution possible, for passing the fluid of the storage from one part to another.

In a further embodiment, an amount of fluid is passed from the second tunnel section to the first tunnel section, by a pump means, should the fluid volume in the first tunnel section fall below a predetermined limit value. This is yet another simple solution used for maintaining the pressure within the arrangement.

According to a second aspect of the present invention, these objects are achieved by the use of such an arrangement for storing thermal energy.

Generally, all terms used in the claims are to be interpreted according to their ordinary meaning in the technical field, unless explicitly defined otherwise herein. All references to 'a/an/the element/device/components/means/etc' are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
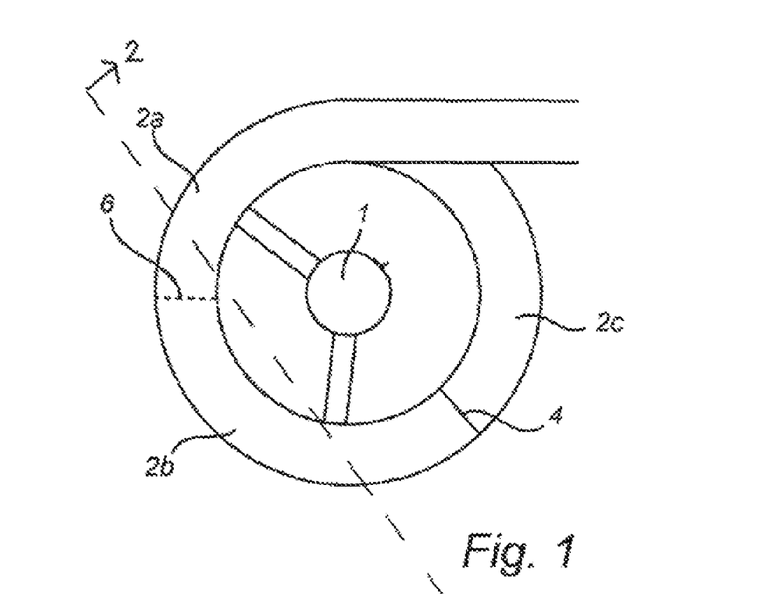
FIG. 1 shows a cross-sectional view along section line 1-1 in FIG. 2 of an embodiment of an arrangement according to the present invention, with portions obscured by ground shown in phantom.
Figure 2:
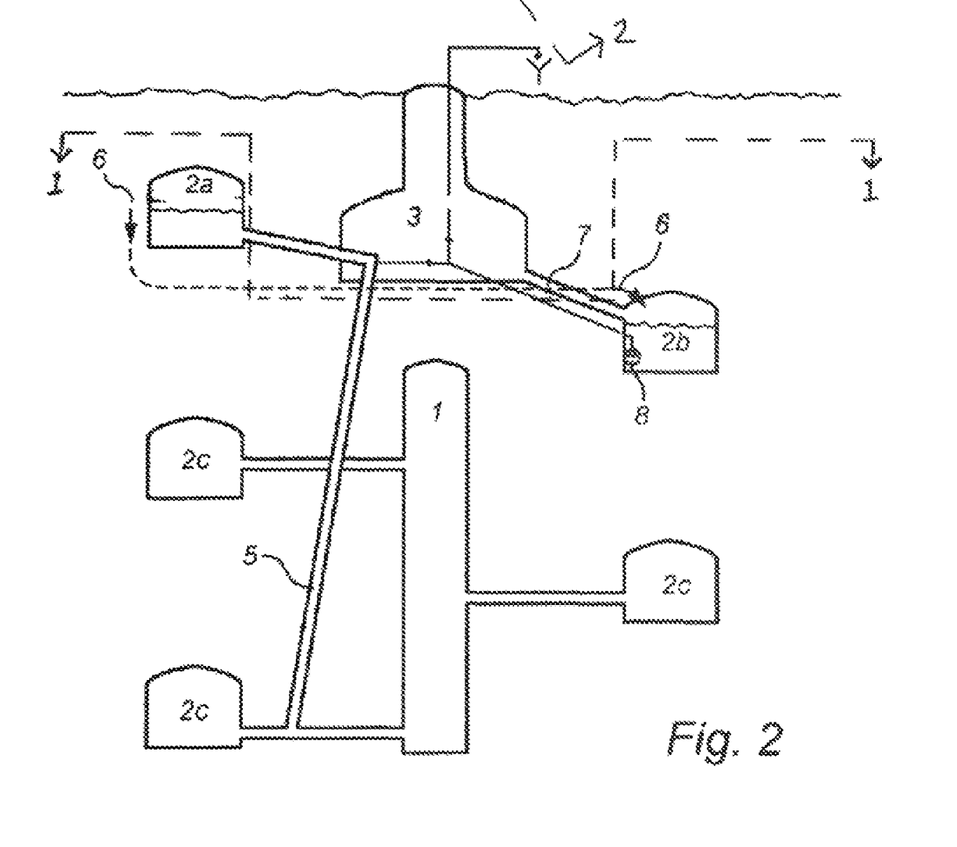
FIG. 2 shows a cross-sectional side view along section line 2-2 in FIG. 1 of an embodiment of an arrangement according to the present invention.
Figure 3:
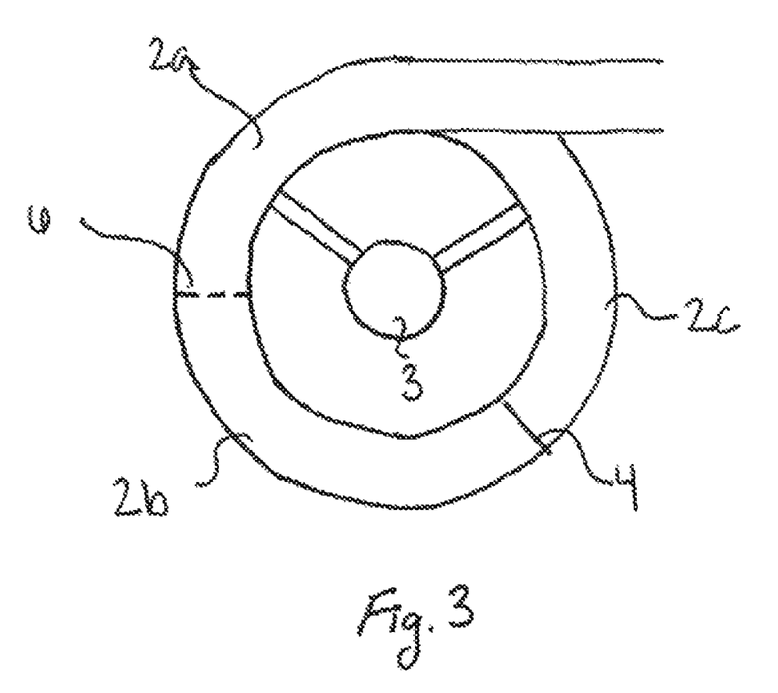
FIG. 3 shows a cross-sectional view of along section line 3-3 in FIG. 2 of an arrangement according to the present invention, with portions obscured by ground shown in phantom.
Figure 4:
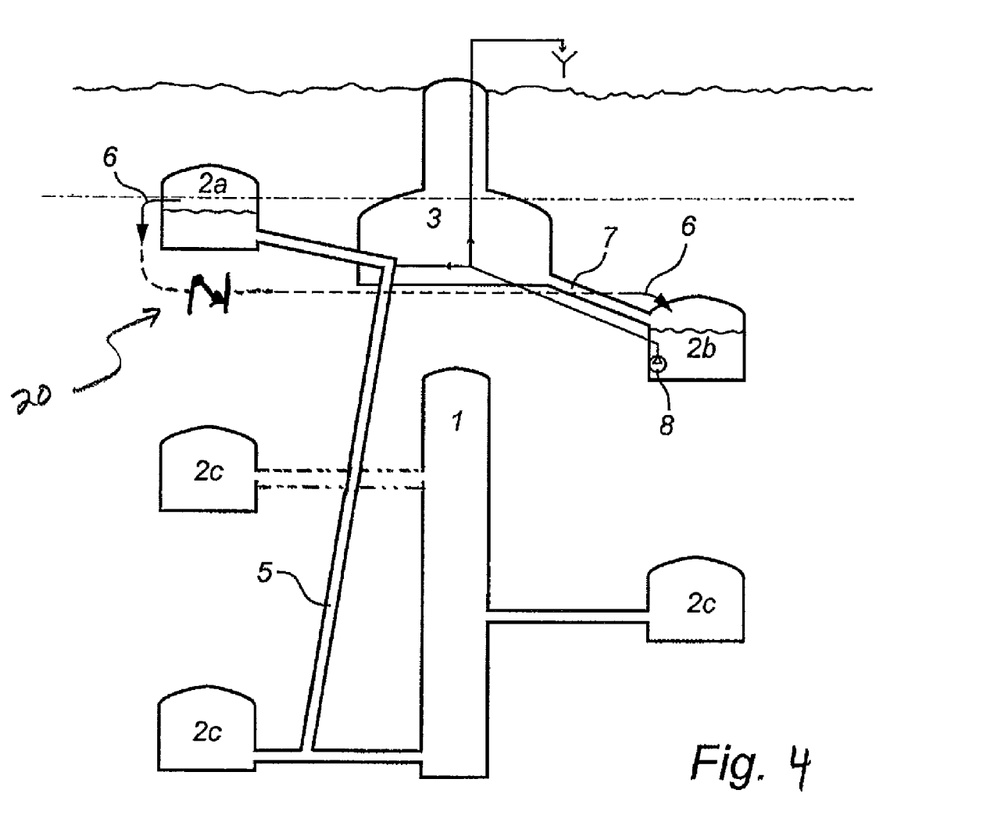
FIG. 4 shows a cross-sectional side view of an alternative embodiment of an arrangement according to the present invention.
Figure 5:
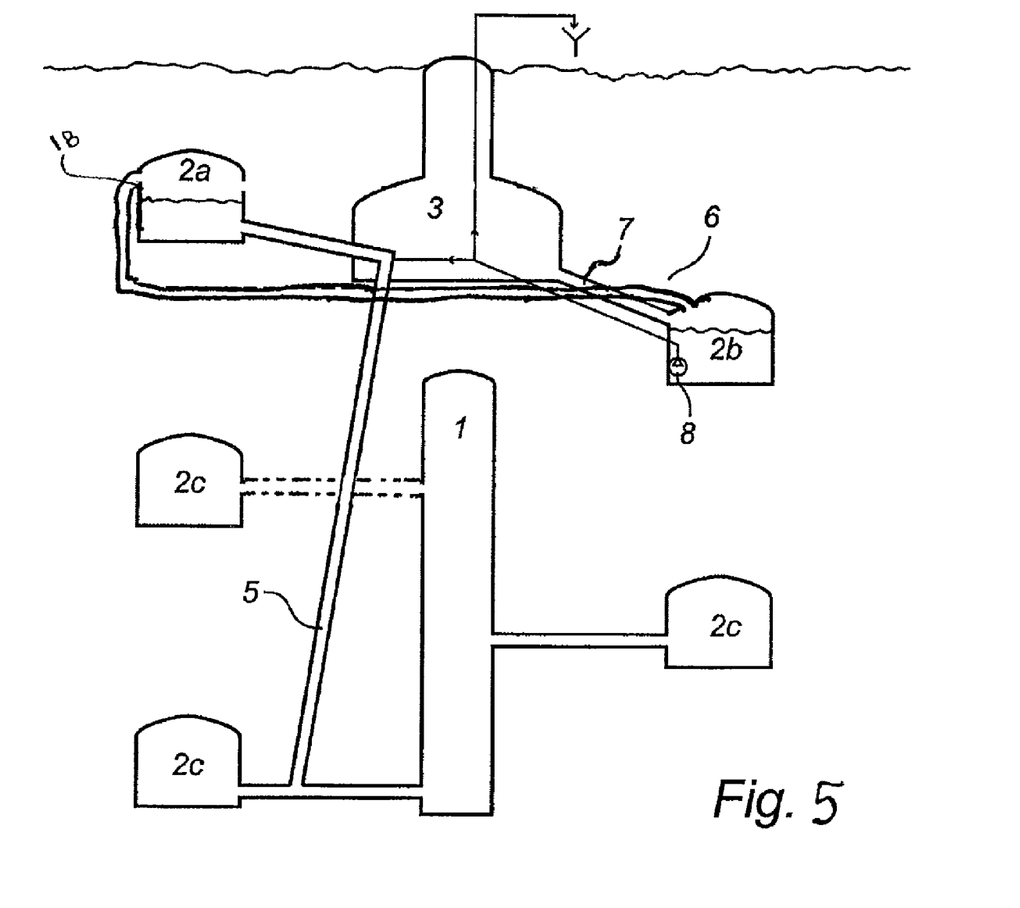
FIG. 5 shows a cross-sectional side view of an alternative embodiment of an arrangement according to the present invention.

FIGS. 1-5 show embodiments of an arrangement for storing thermal energy underground. The heat which is stored comes primarily from existing production facilities which are connected to a district heating system, such as combined heat and power plants. Other possible heat generators are, e.g., solar collectors and industrial waste heat.

The arrangement comprises a shaft 1 and at least one tunnel 2. The shaft 1 and the tunnel 2 are in fluid communication with each other, for example, via fluid connections 10, 12 and 14. The shaft 1 extends essentially vertically, while the at least one tunnel 2, e.g., is arranged such that it surrounds the shaft 1 in the form of a helix spiral from the top to the bottom of the shaft 1.

The tunnel 2 comprises at least three sections, i.e. a first tunnel section 2a, a second tunnel section 2b, and a third tunnel section 2c. The tunnel sections 2a-2c are arranged consecutively along the extent of the tunnel, i.e. first the first section 2a, thereafter the second section 2b, and finally the third section 2c as seen in the vertical direction from its top to its bottom. The third section 2c may actually comprise a number of subsections, however, for the sake of simplicity, the description below always refers to the third section 2c as a single section.

One end of the first tunnel section 2a constitutes the very entrance into the tunnel, which often is located at ground surface level.

The first tunnel section 2a is further connected to the third tunnel section 2c and/or the shaft 1, preferably at the bottom part, through the use of first transfer means 5. When the fluid volume of the first tunnel section 2a falls below a predetermined limit value, and hence also the pressure in the storage, the first transfer means 5 may be used to pass fluid from the third tunnel section 2c and/or the shaft 1 to the first tunnel section 2a in order to reach a volume above a predetermined. If necessary, fluid may be passed from the first tunnel section 2a to the third tunnel section 2c and/or the shaft 1 in the corresponding way also using the first transfer means 5. I.e., the balancing of the pressure in tunnel section 2a is done using the first transfer means 5 for increasing or decreasing the amount of fluid within tunnel section 2a.

The second tunnel section 2b is arranged between the first 2a and third 2c tunnel sections such that it is connected to the first tunnel section 2a at second transfer means 6 and the third tunnel section 2c at the opposite end 4. The second transfer means 6 which is connected to the first tunnel section 2a is open for fluid communication, even though not completely, through the use of second transfer means 6, which are described in more detail below. The end 4 which is connected to the third tunnel section 2c is sealed off impermeably such that no fluid can pass from the third tunnel section 2c to the second tunnel section 2b. The opposite end of the third tunnel section 2c is, in turn, connected to the shaft 1, preferably a bottom portion of the shaft 1.

The shaft 1 and the third tunnel section 2c are adapted for holding fluid for thermal storage, i.e. they hold fluid during normal use of the storage. The amount of fluid is usually such that the shaft 1 and the third tunnel section 2c are completely filled with fluid. The first tunnel section 2a mainly holds a certain level of fluid for the purpose of maintaining the pressure in the storage at a level within a predefined interval, i.e. the first tunnel section 2a usually holds fluid for thermal storage and is therefore a part of the storage arrangement. It may however also function as a temporary short term buffer area in response to small amounts of excess fluid from or a shortage of fluid in the shaft 1 and/or the third tunnel section 2c, i.e. a change of the fluid level occurs within the first tunnel section 2a in response to expansion or contraction of the fluid in shaft 1 and the third tunnel section 2c.

The second tunnel section 2b, however, is to be used merely as an expansion space. If the volume of the fluid located in the shaft 1 and the third tunnel section 2c expands, e.g. due to heat, the excess volume of fluid is passed from the shaft 1 or the third tunnel section 2c into the first tunnel section 2a by first transfer means 5 such as a pipe or a channel.

Should the volume of the first tunnel section 2a also be insufficient for holding the excess volume of fluid, then the fluid is passed from the first tunnel section 2a into the second tunnel section 2b via second transfer means 6 such as a pipe or a channel (FIG. 2), or a partial wall 18 (FIG. 5), or a one-way valve 20 (FIG. 4) arranged between the first 2a and second 2b tunnel sections. Independently of its exact design, the second transfer means 6 is arranged such that it passes fluid from the first tunnel section 2a into the second tunnel section 2b only when a certain volume is exceeded within the first tunnel section 2a, i.e. it essentially functions as a spillway. E.g., if the connection 6 between the first tunnel section 2a and the second tunnel section 2b comprises a partial wall 18, this partial wall 18 extends within the tunnel 2 such that the height of the partial wall is adapted to always keep a certain volume of fluid within the first tunnel section 2a. Any excess fluid, above this volume, will flow over the top of the partial wall 18 into the second tunnel section 2b.

The arrangement further comprises a separate machine room 3 being arranged in proximity to the shaft 1, i.e. the machine room 3 and the shaft 1 are not connected to each other, e.g. by means of a tunnel, but are nevertheless arranged quite close to one another. The arrangement also comprises a third transfer means 7 which connects the machine room 3 to the second tunnel section 2b. The machine room 3 comprises the process equipment for the arrangement, e.g. heat exchangers, pumps, and telescopic extraction pipes used to extract and return fluid from and to the shaft of the storage. Should a volume of fluid enter the machine room 3, e.g. from the shaft 1 or from tunnel 2a, as the result of a leakage or an accident, the third transfer means 7 is used to remove the fluid from the machine room and pass it to the second tunnel section 2b. The third transfer means 7 is preferably a pipe or a channel. Since the machine room 3 preferably is located above the tunnel 2b, as seen in the vertical direction, it is suitable to let gravity perform the removal.

When the fluid volume of the first tunnel section 2a falls below a predetermined limit value, and hence also the pressure in the storage, pump means 8 may be used to pass fluid from the second tunnel section 2b to the first tunnel section 2a in order to reach a volume above a predetermined. I.e., the balancing of the pressure in tunnel section 2a is done using the pump means 8 for increasing or decreasing the amount of fluid within tunnel section 2a.

Should the volume of fluid in the second tunnel section 2b become too large, and if it would be impossible to transfer it to the first tunnel section 2a, then the excess fluid is to be pumped outside the arrangement, e.g. to a surface water runoff. This is however to be avoided as far as possible, since water has an economical value and is a limited natural resource.

The fluid pressure level in tunnel section 2a and thus also the pressure level in the storage should, when the fluid consists of water, be balanced to the level of the surrounding ground water pressure. However, when the fluid is not water, the fluid pressure level in tunnel section 2a should be balanced to a level slightly below the level of the surrounding ground water pressure, in order to eliminate leakage of fluid from the storage to the surrounding ground water, and hence the influence on the surrounding ground water. This method is for example to be used when storing hydrocarbon with fossil origin or biological origin (bio-fuel), salt solutions, brine, ammonia, or some other cooling medium in unlined caverns.

The person skilled in the art realizes that the present invention by no means is limited to the preferred embodiments described above. On the contrary, many modifications and variations are possible within the scope of the appended claims. For example, the arrangement of machine room, transfer means, tunnel sections, and shaft relative each other may vary in the vertical direction, such that the use of pumps, channels, pipes, or valves is adapted to the specific storage configuration.

The invention claimed is:

1. An arrangement for storing thermal energy, comprising a shaft (1) and at least one tunnel (2),
said shaft (1) and said at least one tunnel (2) being in fluid communication with each other,
said at least one tunnel (2) comprising at least a first tunnel section (2a), a second tunnel section (2b) comprising a second tunnel section first end and a second tunnel section second end (4), and a third tunnel section (2c),
said second tunnel section (2b) being arranged between and connected to said first tunnel section (2a) at said second tunnel section first end and directly connected to said third tunnel section (2c) at said second tunnel section second end (4),
said second tunnel section (2b) being sealed off impermeably at said second tunnel section second end (4) such that no fluid can pass directly from said second tunnel section to said third tunnel section (2c) at said second tunnel section second end (4), and said third tunnel section (2c) further being connected to said shaft (1),
said shaft (1) and first (2a) and third (2c) tunnel sections being adapted for holding a fluid for thermal storage,
said arrangement further comprising a first transfer means (5) for passing excess fluid from said shaft (1) or said third tunnel section (2c) into said first tunnel section (2a),
and a second transfer means (6) for passing excess fluid from said first tunnel section (2a) to said second tunnel section (2b) so that second tunnel section (2b) may receive excess fluid from said first tunnel section (2a);
the arrangement further comprising a separate machine room and a third transfer means (7) connecting said machine room (3) to said second tunnel section (2b).

2. The arrangement according to claim 1, wherein said first transfer means (5) comprises a pipe or a channel.

3. The arrangement according to claim 1, wherein said second transfer means (6) comprises a pipe, a channel, a partial wall, or a one-way valve.

4. The arrangement according to claim 1, wherein said third transfer means (7) comprises a pipe or a channel.

5. The arrangement according to claim 1, further comprising a pump (8) configured to pass an amount of fluid from said second tunnel section (2b) to said first tunnel section (2a) should the fluid volume in said first tunnel section (2a) fall below a predetermined limit value.

6. The arrangement according to claim 1, wherein said shaft (1) extends vertically and said tunnel (2) is arranged such that it surrounds the shaft (1) in the form of a helix spiral from the top to the bottom of the shaft (1).

7. The arrangement according to claim 1, wherein said second transfer means (6) comprises a partial wall.

8. The arrangement according to claim 1, wherein said second transfer means (6) comprises a one-way valve.

9. A method of storing thermal energy comprising
providing the arrangement of claim 1;
disposing fluid for thermal energy storage in said shaft (1) and said third tunnel section (2c); and
maintaining fluid in said first (2a) tunnel section (2a) at a predetermined fluid pressure level.

10. The method of claim 9, wherein the fluid is not water and the fluid pressure level in tunnel section (2a) is balanced to a level slightly below the level of the surrounding ground water pressure.

11. The method of claim 9, wherein the fluid is water and the fluid pressure level in tunnel section (2a) is balanced to the level of the surrounding ground water pressure.

12. The method of claim 9, wherein the fluid pressure level in said first tunnel section (2a) is balanced by addition of fluid from said third tunnel section (2c) or said shaft (1); and removal of fluid from said first tunnel section (2a) to said third tunnel section (2c) or said shaft (1).

13. The method of claim 9, wherein the fluid pressure level in said first tunnel section (2a) is balanced by addition of fluid from said second tunnel section (2b) to said first tunnel section (2a) by a pump (8), by addition of fluid from said third tunnel section (2c) or by addition of fluid from said shaft (1); and by removal of fluid from said first tunnel section (2a) to said third tunnel section (2c) or said shaft (1).

* * * * *